No. 800,308. PATENTED SEPT. 26, 1905.
A. DE LASKI, P. D. THROPP & H. DECK.
VEHICLE TIRE.
APPLICATION FILED DEC. 18, 1903.
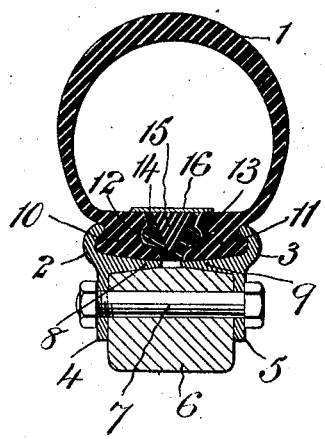
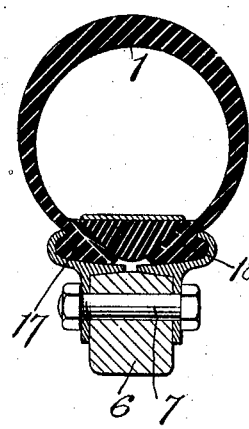
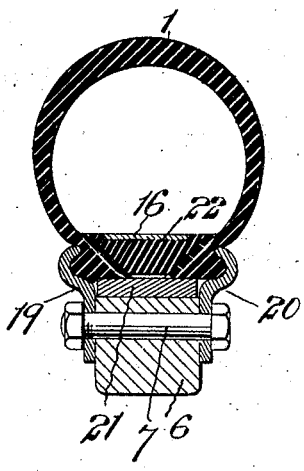
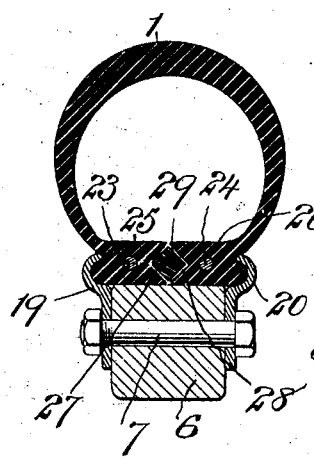
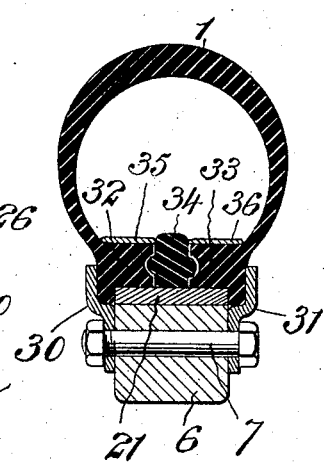
Witnesses:
F. George Barry
Henry Theim
Inventors
Albert deLaski
Peter D. Thropp
Henry Deck
By Brown & Duvall
Their Attorneys

UNITED STATES PATENT OFFICE.

ALBERT DE LASKI, PETER D. THROPP, AND HENRY DECK, OF TRENTON, NEW JERSEY.

VEHICLE-TIRE.

No. 800,308.     Specification of Letters Patent.     Patented Sept. 26, 1905.

Application filed December 18, 1903. Serial No. 185,629.

*To all whom it may concern:*

Be it known that we, ALBERT DE LASKI, PETER D. THROPP, and HENRY DECK, citizens of the United States, and residents of Trenton, in the county of Mercer and State of New Jersey, have invented a new and useful Vehicle-Tire, of which the following is a specification.

Our invention relates to a vehicle-tire, and more particularly to a tire of what is known as the "clencher-tire," with the object in view of making the clencher-tube itself an inflatable pneumatic tube regardless of whether it does or does not have an inner inflatable tube.

A practical embodiment of our invention is represented in the accompanying drawings, in which—

Figure 1 is a transverse section of a tire and rim embodying our invention and showing the parts in assembled adjustment, and Figs. 2, 3, 4, and 5 represent similar views of modified forms.

No inner inflatable tube is shown in connection with the present illustration of our invention, as such a tube forms no part thereof, although it might be used in connection with it, if desired.

The clencher-tube is denoted by 1 and is, as usual, separated at its base throughout its length and held in position by flanged keepers (denoted in Figs. 1 and 2 by 2 and 3) and having depending annular flanges 4 and 5, through which the keepers are bolted to the rim 6 by through-bolts 7.

In the form shown in Figs. 1 and 2 the keepers are curved inwardly at their outer edges to retain the base of the tube 1 against displacement in a radial direction, as well as in a lateral direction, and these keepers are further provided at the outer face of the rim 6 with inwardly-projecting flanges 8 and 9, which extend over the outer face of the rim 6 into proximity to one another and serve as seats for the base of the tube 1. The opposite faces of the base-sections 10 and 11 of the tube 1 are, as shown in Fig. 1, inclined, so as to gradually approach each other as they extend downwardly toward their seats 8 and 9, and also are provided with recesses 12 and 13. These inclined faces of the base portions 10 and 11 are covered with layers of soft rubber 14, which is so formed as to fill the recesses 12 and 13. This soft-rubber body is forced tightly against the opposite inclined faces of the base portions 10 and 11 by means of an annular wedge-shaped piece 15 of harder rubber, which in the present instance is held in position when the tire is deflated as well as when it is inflated by means of an anti-elongating ring 16, preferably of thin metal and sufficiently wide to cover the base of the wedge-piece 15, the upper edges of the soft-rubber layer on opposite sides of the wedge-piece lapping a greater or lesser distance over onto the base portions 10 and 11 of the clencher-tube.

The above structure forms an effective seal at the base of the clencher-tube, so that it may be inflated in the same manner in which the ordinary inflatable tube is inflated by means of a valve of ordinary structure applied thereto. When it is so inflated, the pressure of the air within it will tend to hold the wedge 15 snugly in position regardless of the effect of the ring 16, and so hold the tube tightly sealed against escape of air from within. This structure has the advantage which is peculiar to clencher-tires, in that it may be opened at pleasure for repairs, while it has the additional advantage of forming in itself an inflatable tube and so becomes a pneumatic tire. The structure is simple and is not liable to get out of order.

In the form shown in Fig. 2 the base portions of the clencher-tire have their adjacent faces inclined at a greater angle to the radial plane and are made plain instead of grooved. In other respects the structure is quite similar to that shown in Fig. 1. These modified base portions, as shown in Fig. 2, are denoted by 17 and 18.

In the form shown in Fig. 3 the keepers (denoted by 19 and 20) are shown without the inwardly-projecting flanges 8 and 9, a tire 21 being shown surrounding the outer face of the rim 6 and forming a seat for the base portions of the clencher-tube. In this form the annular anti-elongating rim 16 is shown embedded in the outer face of the wedge 22 to a depth substantially equal to the thickness of the rim material.

In the form shown in Fig. 4 the keepers are of the same form as shown in Fig. 3, and the rim 6 is provided with no tire on its outer face, the base portions 23 24 of the clencher-tube resting directly on the outer face of the rim. In this instance the anti-elongating strips consist of wires 25 26, embedded in the base portions 23 24, respectively, and the opposite faces of these base portions of the clencher-tube are provided with V-shaped recesses 27 28 for receiving the opposite sides of a soft-rubber ring 29, rectangular in cross-section and set with its edges at the bottoms of the V-shaped recesses.

In the form shown in Fig. 5 the keepers (denoted by 30 31) do not turn inwardly at their outer edges to hold the tire against the radial displacement, but extend in radial planes up the outer sides of the base portions of the clencher-tube. In this form the rim 6 is provided with a tire similar to the form shown in Fig. 3, while the base portions 32 33 of the clencher-tube have their bases notched to extend down past the edges of the tire 21 and their adjacent faces provided with recesses similar to those shown in Fig. 1, the faces being substantially parallel instead of inclined, as in Fig. 1, and spaced apart to receive between them a ring 34, of soft rubber, having on its opposite sides projections to fit the recesses in the faces of the base portions 32 33. In this form the clencher-tube is held in position on the rim by means of two anti-elongating strips 35 36, located on opposite sides of the soft-rubber ring 34.

These several illustrations represent types of numerous specific forms which the soft-rubber sealing material may assume in its relation to the base portions of the clencher-tube and of the various forms which the base portions themselves and their keepers may assume with respect to the rim of the wheel.

What we claim is—

1. The combination with a clencher-tire having the opposite faces of its base portion inclined and a soft-rubber ring applied to said inclined surfaces of a wedge-shaped annular ring of harder rubber engaged with the soft-rubber annular ring for holding the latter in snug contact with the inclined faces of the base portion of the tire and means for holding the tire in position.

2. The combination with a clencher-tire having the opposite faces of its base portion recessed, of a soft-rubber ring arranged to engage the recesses in the opposite faces of said base portions and means for holding the soft-rubber ring in position.

3. The combination with a clencher-tire having the opposite faces of its base portion inclined and provided with recesses, of a soft-rubber ring arranged to engage the said inclined faces and recesses and means for holding the soft-rubber ring in position to seal the tire.

In testimony that we claim the foregoing as our invention we have signed our names, in presence of two witnesses, this 14th day of November, 1903.

ALBERT DE LASKI.
PETER D. THROPP.
HENRY DECK.

Witnesses:
MARY L. I. NEAL,
JAMES BUCHANAN.